US010437727B2

(12) United States Patent
Phelan et al.

(10) Patent No.: US 10,437,727 B2
(45) Date of Patent: Oct. 8, 2019

(54) TRANSPARENT HOST-SIDE CACHING OF VIRTUAL DISKS LOCATED ON SHARED STORAGE

(71) Applicant: VMware, Inc., Palo Alto, CA (US)

(72) Inventors: Thomas A Phelan, San Francisco, CA (US); Mayank Rawat, Sunnyvale, CA (US); Deng Liu, Mountain View, CA (US); Kiran Madnani, Santa Clara, CA (US); Sambasiva Bandarupalli, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 15/965,801

(22) Filed: Apr. 27, 2018

(65) Prior Publication Data

US 2018/0246810 A1  Aug. 30, 2018

Related U.S. Application Data

(63) Continuation of application No. 15/145,109, filed on May 3, 2016, now Pat. No. 9,983,998, which is a
(Continued)

(51) Int. Cl.
*G06F 12/08* (2016.01)
*G06F 12/0866* (2016.01)
(Continued)

(52) U.S. Cl.
CPC .......... *G06F 12/0866* (2013.01); *G06F 3/061* (2013.01); *G06F 3/0631* (2013.01);
(Continued)

(58) Field of Classification Search
CPC .. G06F 12/0866; G06F 9/45558; G06F 9/455; G06F 3/061; G06F 3/0631;
(Continued)

(56) References Cited

U.S. PATENT DOCUMENTS 7,840,775 B2   12/2010   Shimada
8,261,265 B2   9/2012    Chen
(Continued)

FOREIGN PATENT DOCUMENTS

JP    2012123556 A    6/2012

OTHER PUBLICATIONS

International Search Report and Written Opinion dated Nov. 11, 2013 from International Application No. PCT/US2013/056857 filed Aug. 27, 2013, 10 pages.
(Continued)

*Primary Examiner* — Pierre Miche Bataille

(57) ABSTRACT

Techniques for using a cache to accelerate virtual machine (VM) I/O are provided. In one embodiment, a host system can intercept an I/O request from a VM running on the host system, where the I/O request is directed to a virtual disk residing on a shared storage device. The host system can then process the I/O request by accessing a cache that resides on one or more cache devices directly attached to the host system, where the accessing of the cache is transparent to the VM.

18 Claims, 5 Drawing Sheets

Related U.S. Application Data continuation of application No. 13/922,985, filed on Jun. 20, 2013, now Pat. No. 9,454,487.

(60) Provisional application No. 61/693,591, filed on Aug. 27, 2012.

(51) Int. Cl.
  *G06F 9/455* (2018.01)
  *G06F 3/06* (2006.01)
  *G06F 9/50* (2006.01)
  *G06F 12/0871* (2016.01)

(52) U.S. Cl.
  CPC ............ *G06F 3/0685* (2013.01); *G06F 9/455* (2013.01); *G06F 9/45558* (2013.01); *G06F 9/5088* (2013.01); *G06F 12/0871* (2013.01); *G06F 2009/45579* (2013.01); *G06F 2212/217* (2013.01)

(58) Field of Classification Search
  CPC .. G06F 3/0685; G06F 9/5088; G06F 12/0871; G06F 12/08
  USPC .................................................. 711/202, 203
  See application file for complete search history.

(56) References Cited

U.S. PATENT DOCUMENTS

| | | | |
|---|---|---|---|
| 8,539,136 | B2 | 9/2013 | Burch et al. |
| 8,661,220 | B2 | 2/2014 | Kono et al. |
| 8,719,817 | B2 | 5/2014 | Aswani |
| 8,756,601 | B2 | 6/2014 | Plondke et al. |
| 8,838,902 | B2* | 9/2014 | Hildebrand ......... G06F 12/0842 711/130 |
| 8,904,113 | B2 | 12/2014 | Chen et al. |
| 2009/0113424 | A1* | 4/2009 | Chen .................. G06F 9/45558 718/1 |
| 2010/0228903 | A1 | 9/2010 | Chandrasekaran et al. |
| 2011/0239213 | A1 | 9/2011 | Aswani et al. |
| 2011/0265083 | A1 | 10/2011 | Davis |
| 2012/0084381 | A1 | 4/2012 | Alladi et al. |
| 2012/0089786 | A1* | 4/2012 | Pruthi ................. G06F 12/0831 711/141 |
| 2012/0137062 | A1 | 5/2012 | Arges et al. |
| 2012/0210066 | A1 | 8/2012 | Joshi et al. |
| 2013/0125115 | A1 | 5/2013 | Tsirkin et al. |
| 2013/0219125 | A1* | 8/2013 | Kusters ............... G06F 12/0871 711/136 |
| 2014/0013059 | A1 | 1/2014 | Joshi et al. |
| 2014/0052892 | A1* | 2/2014 | Klein .................. G06F 12/0246 711/103 |
| 2014/0115228 | A1* | 4/2014 | Zhou .................... G06F 9/45533 711/102 |
| 2014/0281376 | A1* | 9/2014 | Yamada ................. G06F 9/3885 712/28 |
| 2015/0135003 | A1* | 5/2015 | Cota-Robles ....... G06F 11/1666 714/6.3 |
| 2015/0205535 | A1 | 7/2015 | Joshi et al. |
| 2015/0242227 | A1 | 8/2015 | Nair |
| 2016/0246503 | A1 | 8/2016 | Phelan et al. |

OTHER PUBLICATIONS

Office Action dated Apr. 9, 2015; U.S. Appl. No. 13/922,985; (9 pgs.).
Office Action dated Sep. 29, 2015; U.S. Appl. No. 13/922,985; (8 pgs.).
Office Action dated Feb. 11, 2016; U.S. Appl. No. 13/922,985; (8 pgs.).
JP Office Action Dated Feb. 9, 2016; JP Application No. 2015-528720; (4 pgs.).
Office Action dated Aug. 18, 2016; U.S. Appl. No. 15/145,109; (25 pgs.).
Office Action dated Feb. 2, 2017; U.S. Appl. No. 15/145,109; (9 pgs.).
Office Action dated Jun. 22, 2017; U.S. Appl. No. 15/145,109; (9 pgs.).
Office Action dated Sep. 11, 2017; U.S. Appl. No. 15/145,109; (11 pgs.).

* cited by examiner

)
TRANSPARENT HOST-SIDE CACHING OF VIRTUAL DISKS LOCATED ON SHARED STORAGE

CROSS-REFERENCES TO RELATED APPLICATIONS

The present application is a continuation of U.S. patent application Ser. No. 15/145,109, filed May 3, 2016, now U.S. Pat. No. 9,983,998, issued May 29, 2018,entitled "Transparent Host-Side Caching of Virtual Disks Located on Shared Storage," which in turn is a continuation of U.S. patent application Ser. No. 13/922,985, filed Jun. 20, 2013, now U.S. Pat. No. 9,454,487, issued Feb. 27, 2014, entitled "Transparent Host-Side Caching of Virtual Disks Located on Shared Storage," which in turn claims the benefit and priority under 35 U.S.C. 119(e) of U.S. Provisional Application No. 61/693,591, filed Aug. 27, 2012, entitled "Transparent Host Side Caching of Virtual Disks Located on Shared Storage." The entire contents of these applications are incorporated herein by reference for all purposes.

BACKGROUND

In data center and enterprise environments, it is common for virtual machines (VMs) running on different host systems to access virtual disks (VMDKs) that reside on a shared storage device, such as a networked storage array. Using shared storage for storing VMDKs provides a number of benefits over using storage that is local to a host system. For example, a shared storage implementation can streamline storage maintenance and configuration, particularly in environments that comprise a large number of host systems. A shared storage implementation can also enable certain virtualization management techniques, such as host failover and live migration of VMs.

However, despite the foregoing benefits, accessing VMDKs from shared storage can, in some cases, negatively affect VM I/O performance. For instance, a VM that is engaged in I/O to a shared storage device may experience poor I/O performance due to network latency between the VM's host system and the shared storage device, I/O congestion at the shared storage device, and other factors. Some server vendors have attempted to address this performance issue by incorporating flash storage devices into host systems for use as a cache. Unfortunately, existing techniques for leveraging such flash storage devices as caches generally require VM-level modifications and/or cache management mechanisms that are specific to certain brands of flash storage devices. As a result, these existing techniques fail to provide a generic host-side caching solution that can be easily and flexibly implemented in any virtualized system environment.

SUMMARY

Techniques for using a host-side cache to accelerate VM I/O are provided. In one embodiment, the hypervisor of a host system can intercept an I/O request from a VM running on the host system, where the I/O request is directed to a virtual disk residing on a shared storage device. The hypervisor can then process the I/O request by accessing a host-side cache that resides one or more cache devices distinct from the shared storage device, where the accessing of the host-side cache is transparent to the VM.

The following detailed description and accompanying drawings provide a better understanding of the nature and advantages of particular embodiments.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details, or can be practiced with modifications or equivalents thereof.

The present disclosure describes a framework that can be implemented within the hypervisor of a host system for accelerating VM I/O using a host-side cache. In one embodiment, the hypervisor can intercept an I/O request originating from a VM, where the I/O request is directed to a VMDK residing on a shared storage device (e.g., a networked storage array). The hypervisor can then process the I/O request by accessing a host-side cache that resides on one or more cache devices (e.g., flash storage devices) distinct from the shared storage device, such that the accessing is "transparent" to the VM (i.e., the VM is unaware that the host-side cache is being accessed, or that the host-side cache exists at all).

With this framework, there is no need to implement code at the VM level in order to take advantage of the host-side cache. Instead, the entire caching process can be automated by, and internal to, the hypervisor. As a result, the framework can accelerate VM I/O performance across all of the hypervisor's VMs, regardless of the software configuration of each VM.

Further, in certain embodiments the framework can be both cache device and shared storage device-agnostic—in other words, the host-side cache that the hypervisor accesses can reside on any type/brand of cache device, and the VMDKs that the hypervisor accesses can reside on any type/brand of shared storage device. In a particular embodiment, multiple heterogeneous cache devices (e.g., cache devices of different brands, capacities, form factors, etc.) can be pooled into a single, logical host-side cache that conforms to a common file system format. The hypervisor can then allocate space in the logical host-side cache across a selected group of VMs (or VMDKs) for caching purposes.

Yet further, in certain embodiments the framework can support a modular architecture for controlling its host-side caching behavior. For example, consider a situation where a flash storage vendor creates a proprietary caching algorithm that it believes works best with its branded flash storage device. To take advantage of this without limiting device interoperability, the framework can allow multiple caching modules (each implementing different caching algorithms) to be simultaneously registered with, or installed in, the hypervisor. An administrator of the host system can then select that vendor's caching module for use with a host-side cache that is resident on that vendor's flash storage device. In this way, the framework can accommodate various third-party caching techniques while remaining cache device-agnostic.

Figure 1:
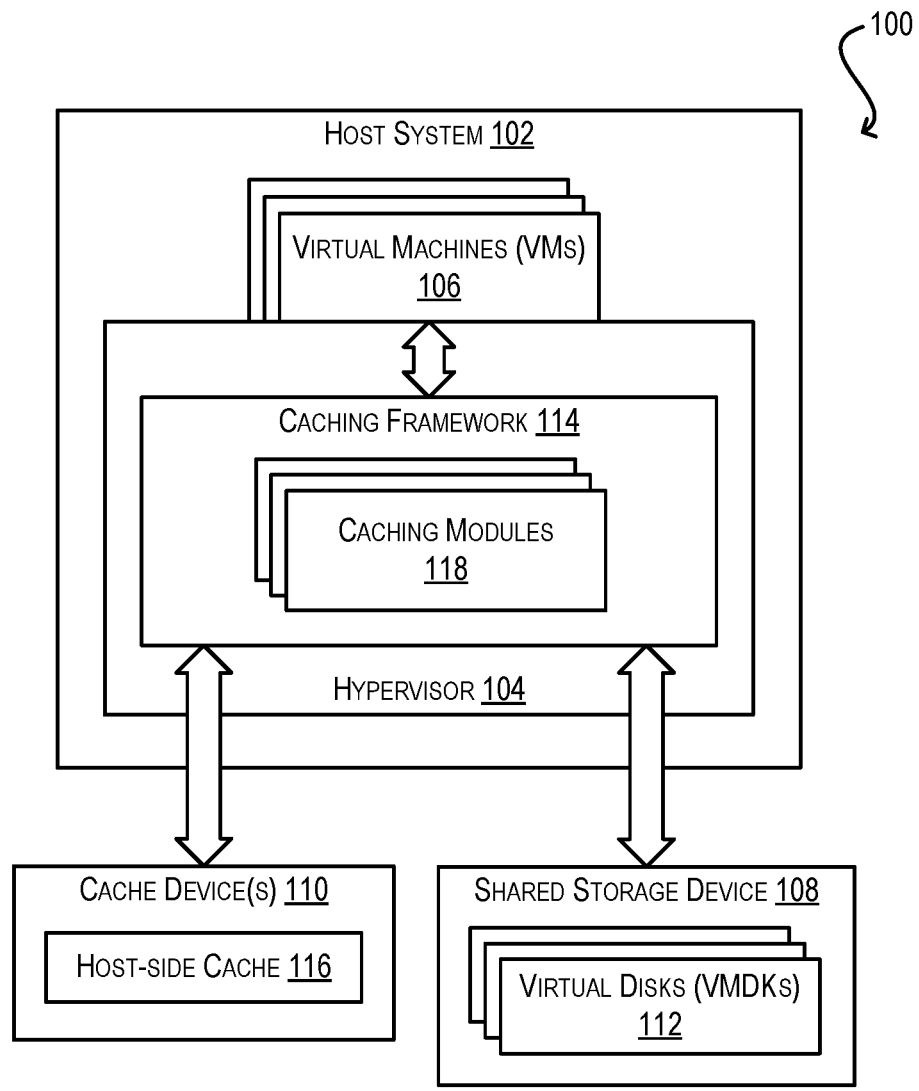
FIG. 1 depicts a block diagram of a system environment that supports transparent host-side caching according to an embodiment.

FIG. 1 depicts a system environment 100 that supports transparent host-side caching according to an embodiment. As shown, system environment 100 includes a host system 102 that executes a hypervisor 104 (also known as a "virtualization layer" or "virtualization software"). Hypervisor 104 provides an environment in which one or more VMs 106 can run. In one embodiment, hypervisor 104 can interact directly with the hardware platform of host system 102 without an intervening host operating system. In this embodiment, hypervisor 104 can include a kernel (not shown) that manages VM use of the various hardware devices of host system 102. In an alternative embodiment, hypervisor 104 can be part of a "hosted" configuration in which the hypervisor runs on top of a host operating system (not shown). In this embodiment, hypervisor 104 can rely on the host operating system for physical resource management of hardware devices. One of ordinary skill in the art will recognize various modifications and alternatives for the design and configuration of hypervisor 104.

System environment 100 further includes a shared storage device 108 and one or more cache devices 110 that are communicatively coupled with host system 102. Shared storage device 108 can be, e.g., a SAN or NAS-based storage array, or any other type of storage device/component that is shared between host system 102 and one or more other host systems. Shared storage device 108 stores virtual disks (VMDKs) 112 that VMs 106 access to read and write persistent data.

Cache devices 110 can comprise flash storage devices (e.g., SSDs, PCI-e based flash cards, etc.), volatile memory devices (e.g., NVRAM), and/or other similar storage/memory devices. In one embodiment, cache devices 110 can be local (e.g., directly attached) to host system 102. In other embodiments, one or more of cache devices 110 can be remote devices that communicate with host system 102 over a network (not shown).

As noted in the Background section, one of the disadvantages of using shared storage (such as shared storage device 108) for storing VMDKs is potentially poor VM I/O performance. Techniques exist for mitigating this performance problem, but these existing techniques generally require VM-level modifications and/or are proprietary to specific brands of cache devices.

To address the foregoing (and other similar) issues, hypervisor 104 of host system 102 can include a caching framework 114. In one embodiment, caching framework 114 can reside immediately below a virtual SCSI (vSCSI) layer within the I/O stack of hypervisor 104, although it should be appreciated that caching framework 114 can reside at any other layer/location within hypervisor 104. In operation, caching framework 114 can intercept I/O requests originating from VMs 106 that are destined for VMDKs 112 on shared storage device 108. Caching framework 114 can then process the I/O requests by accessing a host-side cache 116 residing on cache devices 110 (in lieu of, or in addition to, accessing shared storage device 108). For example, if an intercepted I/O request is a read request, caching framework 114 can check whether the requested data is already available in host-side cache 116. If so, caching framework 114 can retrieve the data directly from cache devices 110 rather than performing a roundtrip to/from shared storage device 108, thereby reducing the I/O latency experienced by the originating VM.

Significantly, caching framework 114 can perform the cache processing described above in a manner that is transparent to VMs 106. Thus, caching framework 114 does not require any changes to the applications or guest operating system(s) running within VMs 106. In addition, unlike certain existing caching implementations, caching framework 114 can be agnostic of the types/brands of cache devices 110 and/or shared storage device 108.

Further, in the embodiment of FIG. 1, caching framework 114 can allow third-party developers (e.g., storage or server vendors) to develop custom/proprietary caching algorithms and register/install these algorithms, as caching modules 118, within framework 114. As described in further detail below, an administrator of host system 102 can associate a particular caching module 118 with a particular cache device, VM, VMDK, etc. (per, e.g., the recommendations/guidelines of the third-party developer that created the caching module). At runtime of host system 102, caching framework 114 can subsequently use this association to invoke the functionality of caching module 118 for that cache device, VM, or VMDK.

Figure 2:
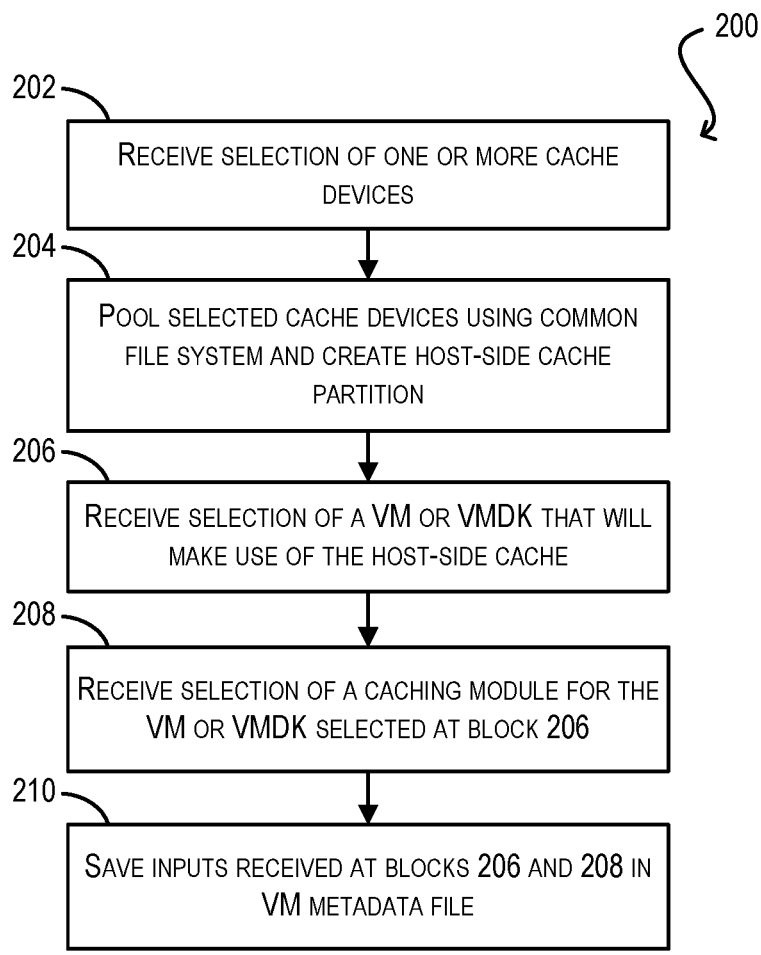
FIG. 2 depicts a flowchart for configuring a host-side cache according to an embodiment.

FIG. 2 depicts a flowchart 200 for creating host-side cache 118 and configuring the operation of caching framework 114 according to an embodiment. For simplicity, it is assumed that flowchart 200 is performed by a management component/interface of hypervisor 104. However, in alternative embodiments, one or more blocks of flowchart 200 can be performed by a central management server that is separate from host system 102.

At block 202, hypervisor 104 can receive, from an administrator of host system 102 (or some other user), a selection of one or more cache devices (e.g., cache devices 110) to be used as a host-side cache by caching framework 114. In one embodiment, the selected cache devices can be homogenous (i.e., identical). In other embodiments, the selected cache devices can be heterogeneous (i.e., devices that have differing types, capacities, brands, etc.). For example, one cache device may be 256GB SSD manufactured by EMC, while another cache device may be a 512GB PCI-e based flash card manufactured by Fusion-io.

At block 204, hypervisor 104 can pool, or combine, the selected cache devices together, such that the cache devices can be accessed and managed as a single, logical cache resource (i.e., host-side cache 116). In certain embodiments, the processing at block 204 can comprise applying a common file system to the selected cache devices, and then creating a host-side cache "partition" across the cache devices using the file system. An example of one such file system is VMware's VFFS (Virtual Flash File System), although it should be appreciated that other file systems may be used. In embodiments where the administrator selects only a single cache device at block 202, this step can be omitted.

Once host-side cache 116 has been defined/created per blocks 202-204, the administrator can configure caching framework 114 to use host-side cache 116 for accelerating the I/O of a particular VM or VMDK of host system 102 (blocks 206-210). For example, at block 206, hypervisor 104 can receive, from the administrator, a selection of the VM or VMDK. As part of this step, hypervisor 104 can receive parameters for controlling the amount of space in host-side cache 116 that should be allocated to the VM/VMDK. This space (referred to as the VM/VMDK's cache allocation) dictates the amount of cached data that host-side cache 116 can hold for the VM/VMDK at a given time. In a particular embodiment, the parameters can include "min" and "max" parameters that specify minimum and maximum sizes for the VM/VMDK's cache allocation respectively. Alternatively or in addition, the parameters can include a "shares" parameter that specifies a percentage of the total size of host-side cache 116 for the VM/VMDK's cache allocation.

At block 208, hypervisor 104 can receive, from the administrator, a selection of a caching module 118 for the VM/VMDK selected at block 206. As noted above, in certain embodiments caching framework 114 can implement a modular architecture in which various third-party developers can create and install their own, custom/proprietary caching algorithms (in the form of caching modules 118) in caching framework 114. This enables the third-party developers to optimize the operation of caching framework 114 for a particular type of cache device, a particular VM, a particular VMDK, and/or the like. With this architecture, multiple caching modules may be installed in caching framework 114 at any given time. Accordingly, the caching module selection received at block 208 allows caching framework 114 to know which caching module to invoke upon intercepting a I/O request related to the selected VM or VMDK at system runtime.

Finally, at block 210, hypervisor 104 can save the inputs received at blocks 206 and 208 in a metadata file (e.g., a VMX file) associated with the selected VM/VMDK.

Figure 3:
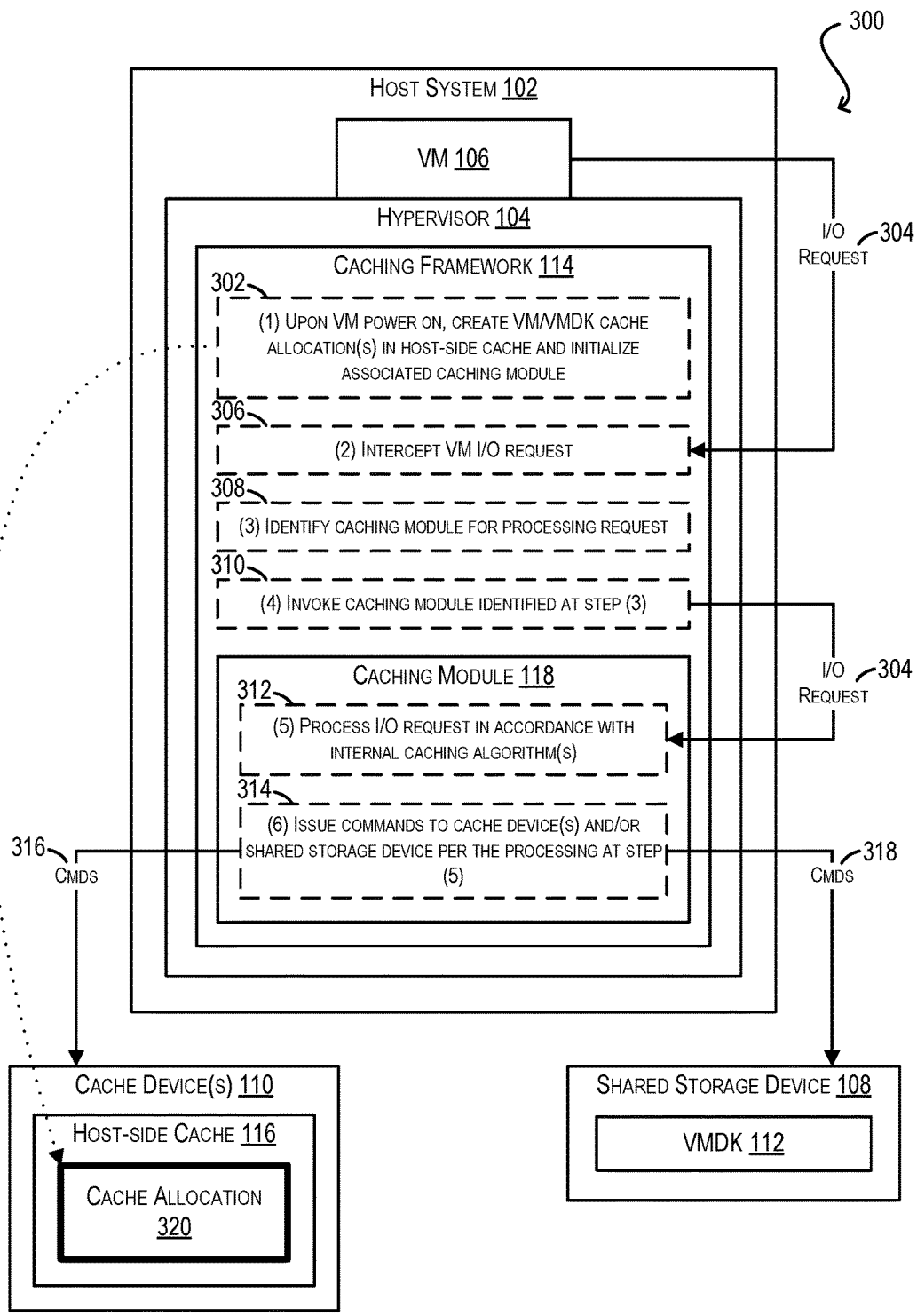
FIG. 3 depicts a flow within the system environment of FIG. 1 for performing transparent host-side caching according to an embodiment.

FIG. 3 depicts a flow 300 that caching framework 114 can perform during the runtime of host system 102 for carrying out transparent host-side caching according to an embodiment. In this example, it is assumed that the administrator of host system 102 has selected VMDK 112 (corresponding to VM 106) as making use of host-side cache 116 per block 206 of FIG. 2. Further, it is assumed that the administrator has selected caching module 118 as being the appropriate caching module for processing I/O requests directed to VMDK 112 per block 208 of FIG. 2.

At step (1) (reference numeral 302), caching framework 114 can create, upon power on of VM 106, a cache allocation 320 for VMDK 112 in host-side cache 116. In one embodiment, cache allocation 320 can correspond to a file that is formatted according to the common file system applied to cache devices 110 at block 204 of FIG. 2. In alternative embodiments, cache allocation 320 can correspond to a set of reserved data blocks in host-side cache 116. By allocating VMDK 112 its own, dedicated portion of host-side cache 116, caching framework 114 can ensure that the caching performance for VMDK 112 is unaffected by the I/O workloads of other VMDKs or VMs that may make use of host-side cache 116.

Generally speaking, the size of cache allocation 320 can conform to the size parameter(s) received at block 206 of FIG. 2 (and stored in VM 106's metadata file). In cases where host-side cache 116 does not have sufficient free space to create cache allocation 320, cache framework 114 can transmit an error message to hypervisor 104, which may abort the VM power on process.

In addition to the above, as part of step (1), caching framework 114 can initialize caching module 118 (i.e., the caching module selected for VMDK 112 at block 208 of FIG. 2) to interoperate with VMDK 112 and host-side cache 116. This initialization process can comprise, e.g., calling an "open( )" function of caching module 118 and passing, as input parameters to the open( )function, handles/pointers to VMDK 112 and host-side cache 116 respectively.

Once caching framework 114 has created cache allocation 320 and initialized caching module 118 per step (1), caching framework 114 can execute a process for transparently handling I/O requests that originate from VM 106 (and are directed to VMDK 112). For example, at steps (2) and (3) (reference numerals 306 and 308), caching framework can intercept such an I/O request 304 and determine that caching module 118 should process the I/O request (by, e.g., examining the VM metadata file created at block 210 of FIG. 2). Caching framework 114 can then call an appropriate function of caching module 118 (e.g., an "asyncio( )" function) for invoking its caching functionality (step (4), reference numeral 310).

In response to the invocation at step (4), caching module 118 can execute its internal caching algorithm(s) to determine how to handle (e.g., cache) the I/O request (step (5), reference numeral 312). For example, if the I/O request is a read request, caching module 118 may perform one type of algorithm, and if the I/O request is a write request, caching module 118 may perform a different type of algorithm. As noted previously, in certain embodiments, caching module 118 may be defined by a third-party developer in order to optimize caching performance. Accordingly, in these embodiments, the caching algorithm(s) that caching module 118 executes at block 312 may be specifically tailored for VMDK 112, the applications/workload of VM 106, and/or cache devices 110.

Finally, at step (6) (reference numeral 314), caching module 118 can issue appropriate commands 316, 318 (via the I/O handles received at step (1)) to host-side cache 116 and/or VMDK 112 in order to read/write data from/to these entities based on the processing of step (5). Although not shown in FIG. 3, hypervisor 104 can also return an acknowledgement to VM 106 indicating that the I/O request has been successfully completed/processed.

With the techniques shown in FIGS. 2 and 3, caching framework 114 can provide a number of advantages over existing host-side caching solutions. First, since runtime flow 300 is encapsulated entirely within hypervisor 104, there is no need to perform any modifications at the VM level in order to take advantage of host-side cache 116; the caching functionality provided by caching framework 114 can apply to any VM running on hypervisor 104 by simply designating the VM as making use of host-side cache 116 per block 206 of FIG. 2. Second, since caching framework 114 is not tied to a particular type/brand of cache device(s) 110 (or shared storage device 108), caching framework 114 can operate in the context of any storage infrastructure, and can even unify multiple, disparate cache devices into a single, logical cache resource (via a common file system). Fourth, by supporting multiple, pluggable caching modules, caching framework 114 can provide for optimized caching performance on a per VM, per VMDK, or per cache device basis. Fifth, by allocating each VM or VMDK is own, dedicated cache allocation within host-side cache 116, caching framework 114 can ensure cache performance isolation across VMs/VMDKs.

Figure 4:
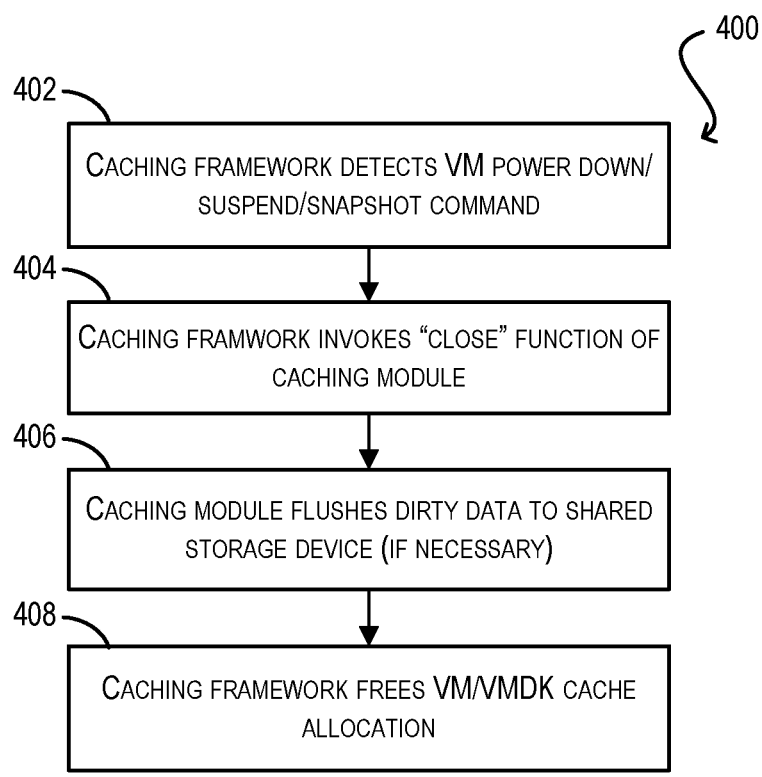
FIG. 4 depicts a flowchart for freeing a VM/VMDK cache allocation according to an embodiment.

One challenge with implementing the host-side caching shown in FIG. 3 is ensuring there is sufficient free space in host-side cache 116 to create new cache allocations as new VMs are powered on. To address this, in certain embodiments caching framework 114 can free cache space that has been allocated to a VM or VMDK when the VM is powered off or otherwise rendered inactive (e.g., suspended, snapshotted, etc.). This prevents the VM/VMDK from unnecessarily occupying cache resources that can be allocated to other, active VMs/VMDKs. FIG. 4 depicts a flowchart 400 of such a process.

At block 402, caching framework 114 can detect a power off/suspend/snapshot command with respect to a VM running on hypervisor 104. In the case of VM power down, the command may originate from the VM itself In the case of VM suspend or snapshot, the command may originate from, e.g., a central management server responsible for managing host system 102.

At block 404, caching framework 114 can invoke a "close( )" function of the VM's associated caching module (and/or the caching modules associated with the VM's VMDKs).

In response, the caching module(s) can flush any dirty data in the VM/VMDK's cache allocation(s), if such dirty data exists (block 406). The caching module(s) can then free the cache space associated with the cache allocation(s) in host-side cache 116 (block 408).

In the case of a VM suspend or snapshot event, the VM will eventually be resumed. In this scenario, upon detecting the VM resume command, caching framework 114 can attempt reallocate space in host-side cache 116 for the VM (and/or its VMDKs) based on the administrator inputs provided in FIG. 2. Like the VM power on scenario, if there is insufficient free space in host-side cache 116 to create the cache allocation, the VM suspend process may be aborted. Alternatively, hypervisor 104 may choose to power on/resume the VM without creating a cache allocation.

Figure 5:
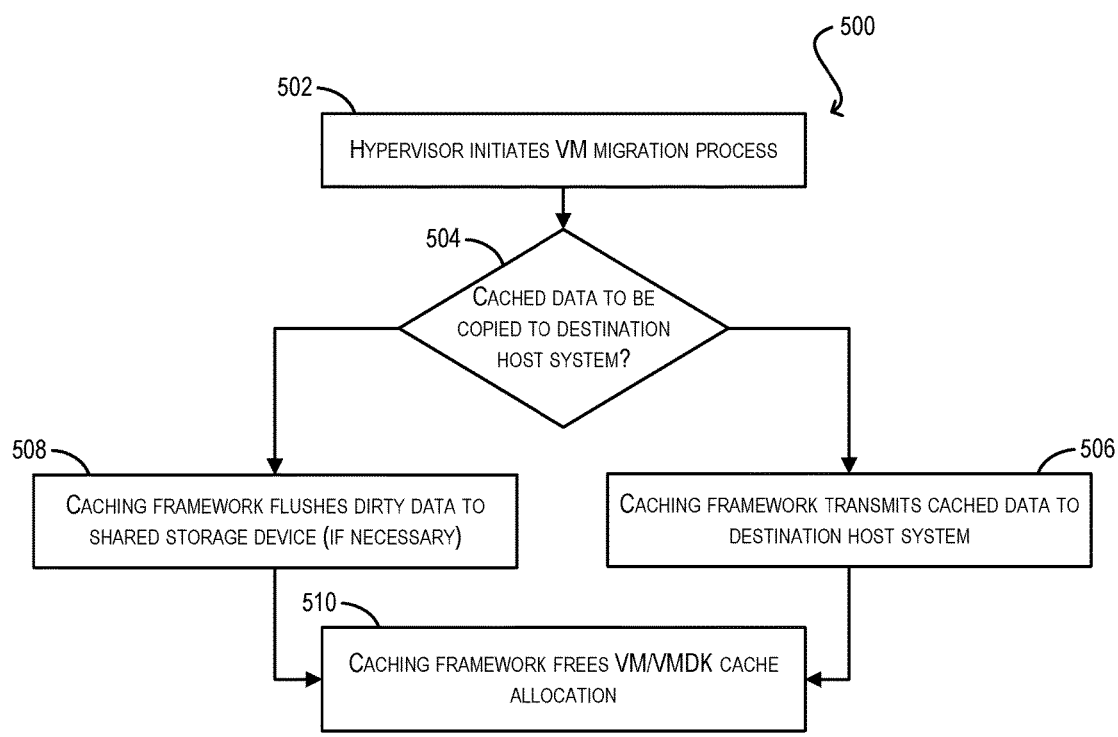
FIG. 5 depicts a flowchart for migrating the contents of a host-side cache during a VM live migration according to an embodiment.

In some embodiments, hypervisor 104 of host system 102 may wish to live migrate a running VM to another (i.e., "destination") host system while caching framework 114 is actively caching I/O requests for the VM (or its VMDKs) in host-side cache 116. In these embodiments, caching framework 114 can also move, as part of the VM migration process, the contents of the VM/VMDK's cache allocation(s) from host-side cache 116 to a corresponding host-side cache at the destination host system. This process essentially "warms up" the host-side cache at the destination host system so that it can used to accelerate the VM's I/O immediately after VM migration. FIG. 5 depicts a flowchart 500 for carrying out such a process according to an embodiment.

At block 502, hypervisor 104 can begin the VM migration to the destination host system. Although not shown, this step can include checking with the destination host system whether it has sufficient free space in its host-side cache to accommodate the VM (and/or its VMDKs) cached data. If the host-side cache on the destination host system does not have sufficient free space, the VM migration process can be aborted.

At block 504, caching framework 114 can determine whether the VM/VMDK's cached data should be copied over to the destination host system. This choice can be configured by, e.g., an administrator of host system 102. If so, caching framework 114 can transmit the cached data to the destination host system so that the data can be populated in the destination host system's host-side cache (block 506). As noted above, this step can warm up the destination host-side cache so that it can immediately begin servicing VM I/O requests.

On the other hand, if the cached data should not be copied over, caching framework 114 can simply flush any dirty data in the VM/VMDK's cache allocation(s) to shared storage device 108 (block 508). This ensures that there is no data corruption in shared storage device 108 when the VM begins executing and accessing data from the destination host system, but does not warm up the destination host-side cache as in block 506.

Finally, at block 510, caching framework 114 can free the VM/VMDK's cache allocation(s) in host-side cache 116 since the VM is no longer running on host system 102.

The embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory (e.g., a flash memory device), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

In addition, while described virtualization methods have generally assumed that virtual machines present interfaces consistent with a particular hardware system, persons of ordinary skill in the art will recognize that the methods described can be used in conjunction with virtualizations that do not correspond directly to any particular hardware system. Virtualization systems in accordance with the various embodiments, implemented as hosted embodiments, non-hosted embodiments or as embodiments that tend to blur distinctions between the two, are all envisioned. Furthermore, certain virtualization operations can be wholly or partially implemented in hardware.

Many variations, modifications, additions, and improvements are possible, regardless the degree of virtualization.

The virtualization software can therefore include components of a host, console, or guest operating system that performs virtualization functions. Plural instances can be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments, and are presented to illustrate the flexibility and advantages of particular embodiments as defined by the following claims. Other arrangements, embodiments, implementations and equivalents can be employed without departing from the scope hereof as defined by the claims.

What is claimed is:

1. A host system comprising:
   a processor; and
   a non-transitory computer readable medium having stored thereon program code that, when executed by the processor, causes the processor to:
      intercept an I/O request from a virtual machine (VM) running on the host system, the I/O request being directed to a virtual disk of the VM; and
      process the I/O request by accessing a host-side cache, wherein a guest operating system of the VM is unaware that the host-side cache is being accessed as part of the processing,
   wherein the host-side cache is spread across a plurality of cache devices local to the host system, and
   wherein the plurality of cache devices are pooled into at least one logical resource.

2. The host system of claim 1 wherein the plurality of cache devices include a solid state disk (SSD) device and a volatile memory device.

3. The host system of claim 1 wherein at least a portion of the plurality of cache devices are heterogeneous devices.

4. The host system of claim 1 wherein the intercepting is performed by a hypervisor of the host system.

5. The host system of claim 1 wherein the processing is implemented via a caching module that is associated with the VM, with the virtual disk, or with one or more of the plurality of cache devices.

6. The host system of claim 1 wherein the plurality of cache devices are pooled into the at least one logical resource by applying a common file system to the plurality of cache devices, and
   wherein the at least one logical resource is created as a partition across the plurality of cache devices using the common file system.

7. A method for using a cache to accelerate virtual machine (VM) I/O, the method comprising:
   intercepting an I/O request from a VM running on a host system, the I/O request being directed to a virtual disk of the VM; and
   processing the I/O request by accessing a host-side cache, wherein a guest operating system of the VM is unaware that the host-side cache is being accessed as part of the processing,
   wherein the host-side cache is spread across a plurality of cache devices local to the host system, and
   wherein the plurality of cache devices are pooled into at least one logical resource.

8. The method of claim 7 wherein the plurality of cache devices include a solid state disk (SSD) device and a volatile memory device.

9. The method of claim 7 wherein at least a portion of the plurality of cache devices are heterogeneous devices.

10. The method of claim 7 wherein the intercepting is performed by a hypervisor of the host system.

11. The method of claim 7 wherein the processing is implemented via a caching module that is associated with the VM, with the virtual disk, or with one or more of the plurality of cache devices.

12. The method of claim 7 wherein the plurality of cache devices are pooled into the at least one logical resource by applying a common file system to the plurality of cache devices, and
   wherein the at least one logical resource is created as a partition across the plurality of cache devices using the common file system.

13. A non-transitory computer readable storage medium having stored thereon computer software executable by a processor of a host system, the computer software embodying a method for using a host-side cache to accelerate virtual machine (VM) I/O, the method comprising:
   intercepting an I/O request from a VM running on a host system, the I/O request being directed to a virtual disk of the VM; and
   processing the I/O request by accessing a host-side cache, wherein a guest operating system of the VM is unaware that the host-side cache is being accessed as part of the processing,
   wherein the host-side cache is spread across a plurality of cache devices local to the host system, and
   wherein the plurality of cache devices are pooled into at least one logical resource.

14. The non-transitory computer readable storage medium of claim 13 wherein the plurality of cache devices include a solid state disk (SSD) device and a volatile memory device.

15. The non-transitory computer readable storage medium of claim 13 wherein at least a portion of the plurality of cache devices are heterogeneous devices.

16. The non-transitory computer readable storage medium of claim 13 wherein the intercepting is performed by a hypervisor of the host system.

17. The non-transitory computer readable storage medium of claim 13 wherein the processing is implemented via a caching module that is associated with the VM, with the virtual disk, or with one or more of the plurality of cache devices.

18. The non-transitory computer readable storage medium of claim 13 wherein the plurality of cache devices are pooled into the at least one logical resource by applying a common file system to the plurality of cache devices, and
   wherein the at least one logical resource is created as a partition across the plurality of cache devices using the common file system.

* * * * *